United States Patent
Mitchell

Patent Number: 5,787,849
Date of Patent: Aug. 4, 1998

[54] VALVE TIMING PHASE CHANGER

[76] Inventor: Stephen W. Mitchell, 93 Lowercroft Road, Bury, Lancashire, BL8 2ER, United Kingdom

[21] Appl. No.: 751,688

[22] Filed: Nov. 18, 1996

[30] Foreign Application Priority Data

Nov. 21, 1995 [GB] United Kingdom ............... 9523742

[51] Int. Cl.$^6$ .................. F01L 1/34; F01L 1/26; F01L 13/00
[52] U.S. Cl. .................. 123/90.17; 123/90.16; 123/90.23; 123/90.27; 123/90.31; 123/193.5
[58] Field of Search .............. 123/90.15, 90.16, 123/90.17, 90.18, 90.22, 90.23, 90.27, 90.31, 90.41, 90.42, 90.6, 193.5, 193.3

[56] References Cited

U.S. PATENT DOCUMENTS

| | | |
|---|---|---|
| 4,505,235 | 3/1985 | Mitchell . |
| 4,872,428 | 10/1989 | Mitchell ............... 123/90.17 |
| 4,913,104 | 4/1990 | Mills .................. 123/90.41 |
| 5,074,260 | 12/1991 | Yagi et al. ............. 123/90.16 |
| 5,080,055 | 1/1992 | Komatsu et al. ......... 123/90.18 |
| 5,095,861 | 3/1992 | Dove, Jr. .............. 123/90.41 |
| 5,333,579 | 8/1994 | Hara et al. ............ 123/90.17 |
| 5,363,818 | 11/1994 | Iwata et al. ........... 123/90.27 |
| 5,365,896 | 11/1994 | Hara et al. ............ 123/90.17 |
| 5,398,649 | 3/1995 | Shimamoto ............. 123/90.27 |
| 5,617,818 | 4/1997 | Luders ................ 123/90.27 |

FOREIGN PATENT DOCUMENTS

| | | |
|---|---|---|
| 2165885 | 4/1986 | United Kingdom . |
| 2231088 | 11/1990 | United Kingdom . |

*Primary Examiner*—Weilun Lo
*Attorney, Agent, or Firm*—Nixon & Vanderhye P.C.

[57] ABSTRACT

A variable phase valve timing assembly for an internal combustion engine. A camshaft driven by a rotating crankshaft of the invention actuates an intermediate member such as a pivotally mounted lever a bucket tappet a first portion of which bears against a cam supported by the camshaft and a second portion of which bears against a valve of the engine such that rotation of the camshaft displaces the intermediate member and valve in a cyclical manner. The camshaft is displaceable relative to the intermediate member along a predetermined path, and means are provided for displacing the camshaft in dependence upon a control input, for example engine speed. The geometry of the predetermined path and of the first portion of the intermediate member are such that movement of the camshaft alters the phase of displacements of the valve relative to rotation of the engine.

18 Claims, 9 Drawing Sheets

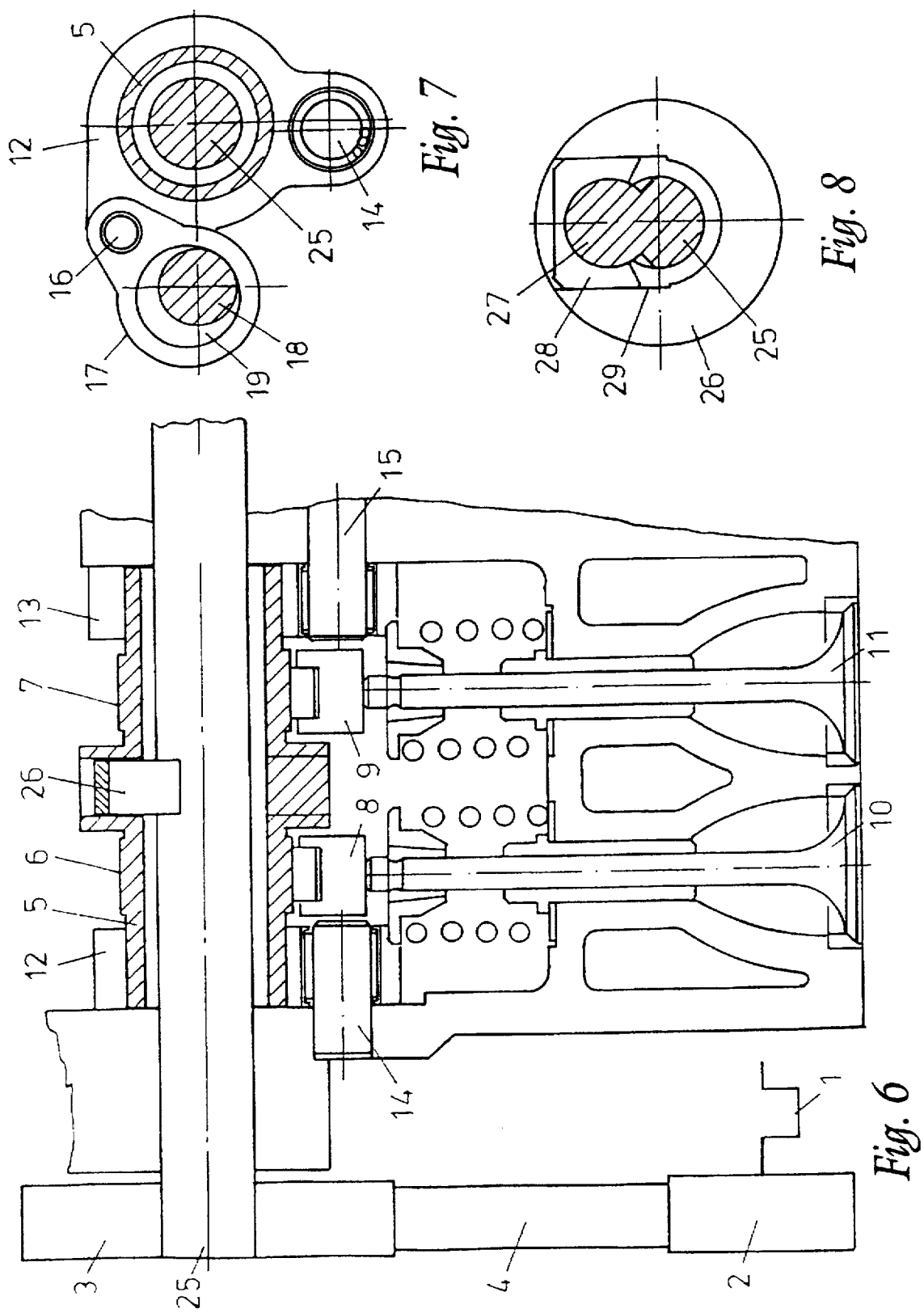

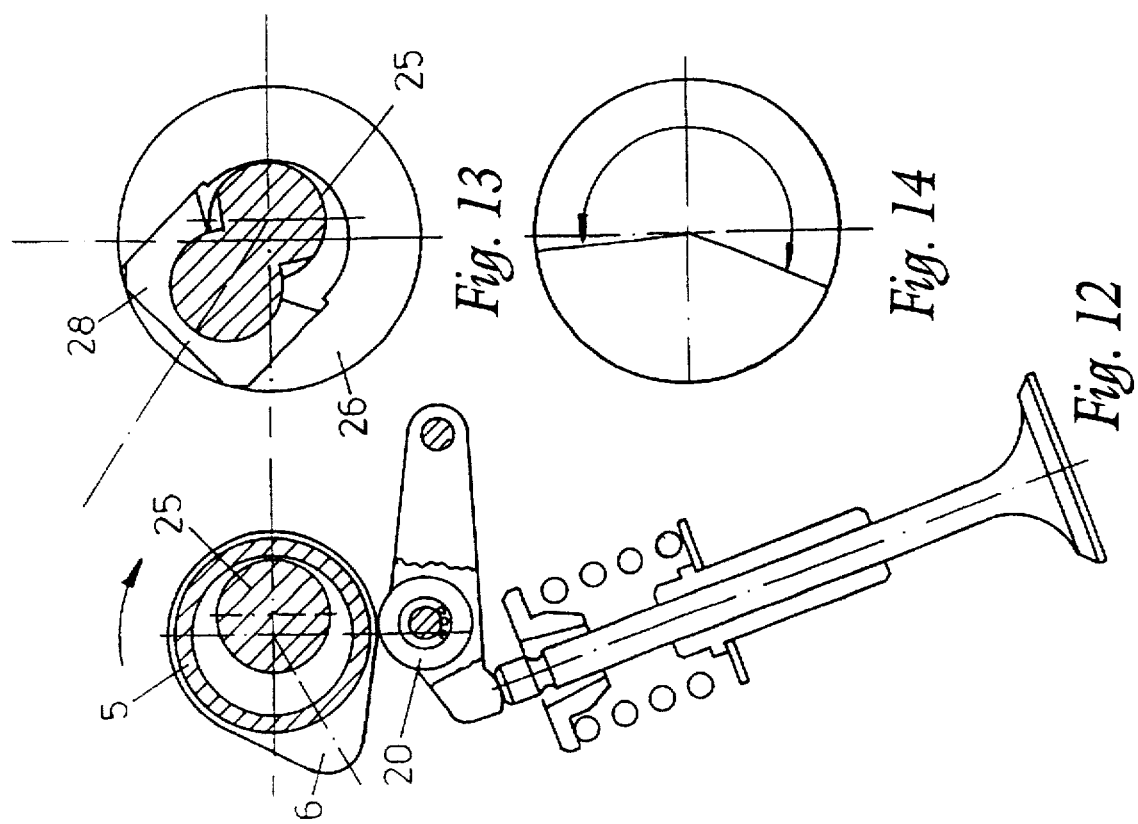
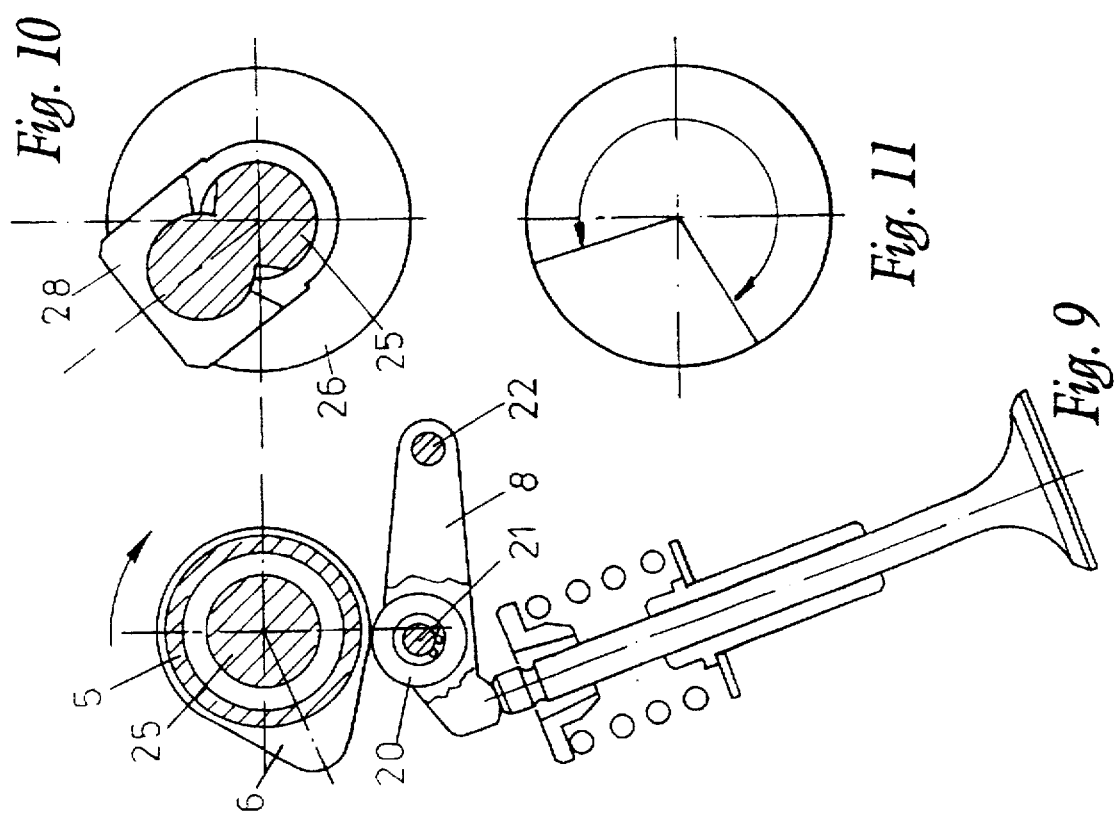

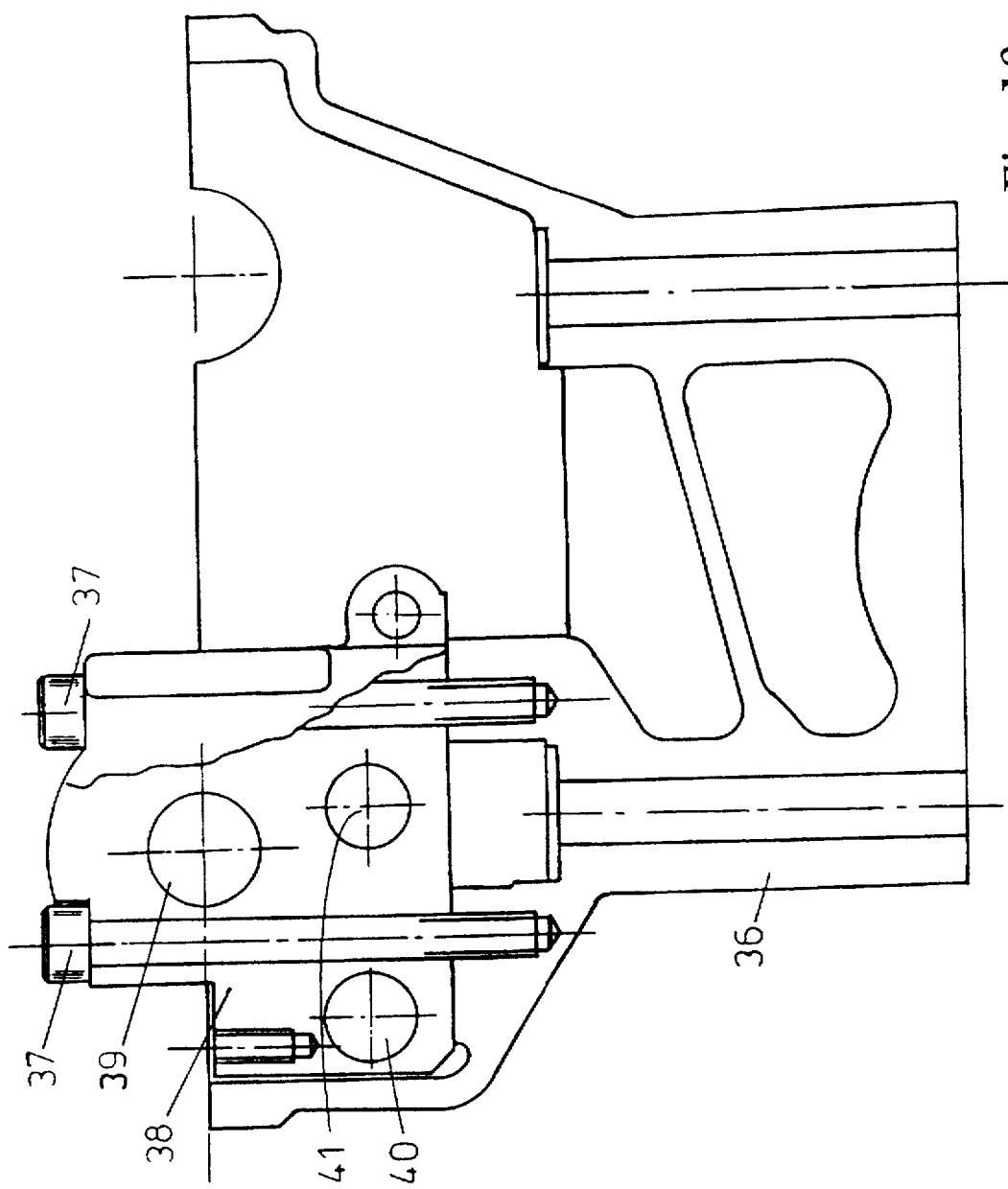

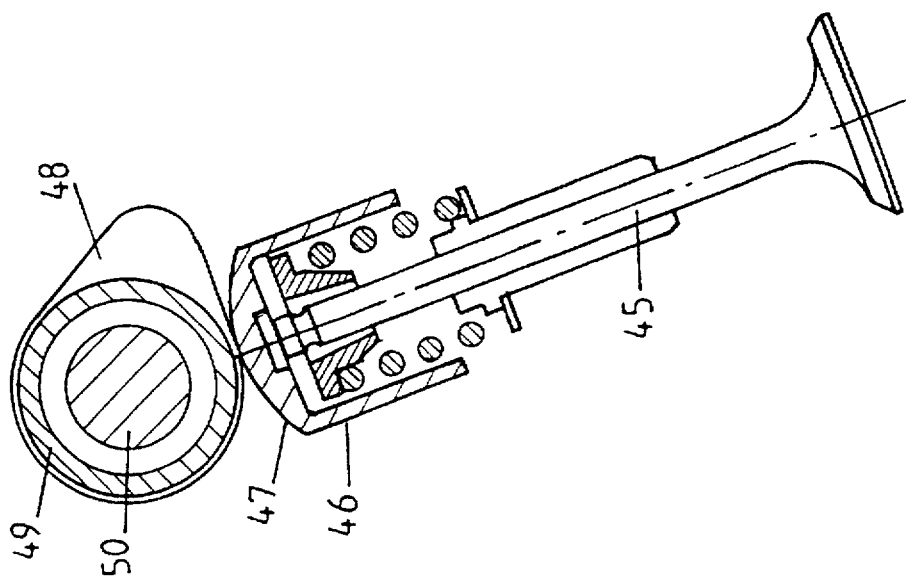

VALVE TIMING PHASE CHANGER

BACKGROUND OF THE INVENTION

1. Field of the Invention

The present invention relates to a valve timing phase changer.

2. Related Art

Camshaft drive mechanisms which provide variable valve timing are known. These fall into several types including types known as phase changers. This type generally does not change the duration of valve timing which is known as the event, but simply advances or retards the camshaft relative to the crankshaft to provide overlap control, that is control of the period during which the inlet and exhaust valves are open together at the commencement of the inlet cycle, or, alternatively, to change the position at which the inlet valve closes as a function of engine speed to provide better volumetric efficiency.

An event changer system is described in British Patent GB2066361. It would be an advantage in such a system to increase the range of variation given to the inlet valve closing and decrease the range of variation given to the inlet valve opening for a given eccentricity, and also to give the opportunity to alter the rates of inlet valve closing and opening more advantageously. This could be achieved using separate phase changer and event changer systems, but not in a practical manner.

U.S. Pat. No. 4,505,235 describes a variable event timing mechanism in which an engine crankshaft drives an intermediate shaft mounted on displaceable bearings and connected by pivotal links to a camshaft mounted on fixed bearings. The axes of rotation of the intermediate shaft and the camshaft are parallel. Displacement of the intermediate shaft varies the eccentricity of the linkage and hence the event timing of a valve driven via a lever by the camshaft. If the shaft axes are coincident, the two shafts rotate at the same speed. The greater the eccentricity between the two shaft axes, the greater is the variation in speed of the camshaft relative to the intermediate shaft during each rotation of the shafts. Thus the duration of valve timing events can be controlled in a desired manner by appropriate selection of the geometry of the intermediate shaft displacement path, the geometry of the linkage, and the magnitude of the displacement of the intermediate shaft.

FIG. 17 of U.S. Pat. No. 4,505,235 shows an alternative arrangement to that described above in which rather than displacing the axis of rotation of the intermediate shaft relative to the camshaft, the axis of rotation of the intermediate shaft is fixed and the camshaft and lever are mounted on a displaceable support. This arrangement is said to produce the same variable event timing characteristics as is produced with a displaceable intermediate shaft and a fixed camshaft, but provides the additional feature of variable valve lift. Variable valve lift arises in this arrangement because the distance between the pivot axis of the lever and the valve it operates varies as the lever and camshaft move relative to the valve. Movement of the lever and camshaft assembly towards the valve reduces valve lift, and vice versa.

The description of FIG. 17 in U.S. Pat. No. 4,505,235 explains that both the camshaft and lever are moved to achieve variable valve lift in addition to variable event timing, and explains that if only the camshaft was displaced and the lever was not displaced movement of the camshaft would alter the valve timing as in the described arrangement in which the camshaft axis is fixed and the intermediate shaft axis is displaced, that is to say event timing would be varied but there would be no variation in valve lift. There is no suggestion that in such an arrangement the components could be arranged such that variable phase could be achieved. Furthermore, it is clear that if the camshaft of FIG. 17 moved along the horizontal guide, but the rocker lever remained fixed in position relative to the engine, movement of the camshaft to the left would result in the valve failing to close, whereas slight movement of the camshaft to the right would result in the rocker lever failing to contact the appropriate part (constant velocity ramp) of the cam surface and further movement would cause a large gap to open which would shorten the valve duration, that is to say an event change. Thus although U.S. Pat. No. 4,505,235 does suggest in passing moving, the camshaft whilst keeping the rocker lever fixed in position, no guidance is given as to how this could be achieved in a practical system, and no suggestion is made as to how such a system could be used to achieve a phase change.

SUMMARY OF THE INVENTION

It is an object of the present invention to provide a valve timing phase changer which is also suitable for use in conjunction with an event changing system relying upon the displacement of the camshaft.

According to the present invention there is provided a valve timing phase changer for an internal combustion engine, comprising a camshaft driven by a rotating crankshaft of the engine, and an intermediate member a first portion of which bears against a cam supported by the camshaft and a second portion of which bears against a valve of the engine such that rotation of the camshaft displaces the intermediate member and the valve in a cyclical manner, wherein the camshaft is displaceable relative to the intermediate member and valve along a predetermined path, and means are provided for displacing the camshaft in dependence upon a control input, the geometry of the predetermined path and of the first portion of the intermediate member being such that movement of the camshaft alters the phase of displacements of the valve relative to rotation of the engine.

The intermediate member may be a pivotally mounted lever. Preferably the first portion of the lever comprises a roller supported on the lever by bearings, or alternatively the first portion of the lever is defined by a curved surface. The camshaft and lever may be mounted on a subassembly which can be bolted to the engine.

Alternatively, the intermediate member may be mounted on the valve, the first portion of the intermediate member being defined by a curved surface.

The camshaft may be mounted in camshaft supports that are pivotally mounted on the engine and coupled to the displacing means, whereby displacement of the camshaft supports causes the camshaft to be displaced along an arcuate path. The displacing means may comprise a control shaft rotatable about its major axis, links pivotally connected to each camshaft support and defining circular apertures through which the control shaft extends, and eccentrics mounted within the apertures and secured to rotate with the control shaft, whereby rotation of the control shaft displaces the links relative to the control shaft axis and thereby displaces the camshaft supports.

Preferably, the camshaft is driven by an intermediate shaft that is driven in synchronism with the crankshaft and the axis of which is fixed in position relative to the engine, the camshaft being coupled to the intermediate shaft such that displacement of the camshaft alters the duration of displacements of the valve relative to rotation of the engine. The camshaft may be tubular, the intermediate shaft extending through the camshaft, displacements of the camshaft varying the eccentricity of the camshaft and intermediate shaft axes. The intermediate shaft may support an eccentric received in a block running in a slot defined in the camshaft.

BRIEF DESCRIPTION OF THE DRAWINGS

Embodiments of the present invention will now be described, by way of example, with reference to the accompanying drawings, in which;

FIG. 6 is a schematic view of a second embodiment of the invention which has a displaceable camshaft as in the case of the embodiment of FIG. 1 but in addition is driven by an eccentric linkage to achieve variable event timing;

FIG. 7 is a section through the camshaft of FIG. 6 and associated components which control the movement of the camshaft;

FIG. 8 is a part sectional view illustrating an eccentric linkage between the camshaft of FIG. 7 and an intermediate shaft also shown in FIG. 7;

FIG. 9 is a part sectional view through the camshaft assembly of FIG. 6 showing the camshaft in a position which it assumes a higher engine speed;

FIG. 10 illustrates the configuration of the eccentric linkage in the inlet valve closing position at high engine speed;

FIG. 11 is a valve timing diagram showing a typical inlet valve timing for high engine speeds;

FIG. 12 is a view similar to that of FIG. 9 showing the camshaft in the position it assumes at low engine speeds;

FIG. 13 is a view similar to that of FIG. 10 showing the configuration of the eccentric linkage in the inlet valve closing position at low engine speed;

FIG. 14 is a valve timing diagram showing a typical inlet valve timing for low engine speed;

FIG. 18 is a schematic illustration of a subassembly mounting structure for the valve timing mechanism of the type shown in FIG. 6 supported on an engine;

FIG. 20 illustrates an alternative embodiment of the invention in which a displaceable camshaft acts on a valve through a bucket tappet mounted on the valve.

DETAILED DESCRIPTION OF EXEMPLARY EMBODIMENTS

Figure 2:
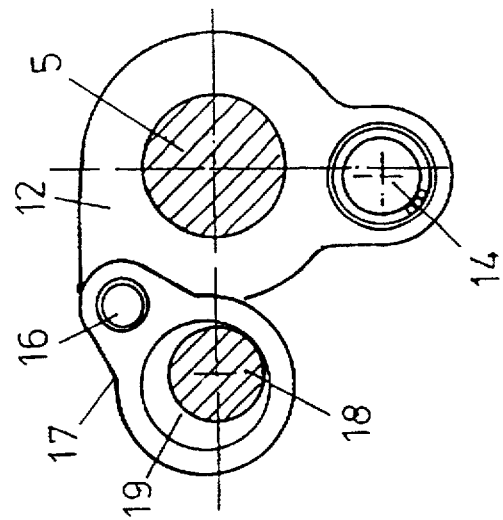
FIG. 2 is a section through the camshaft of FIG. 1 and associated components which control the movement of the camshaft.
Figure 1:
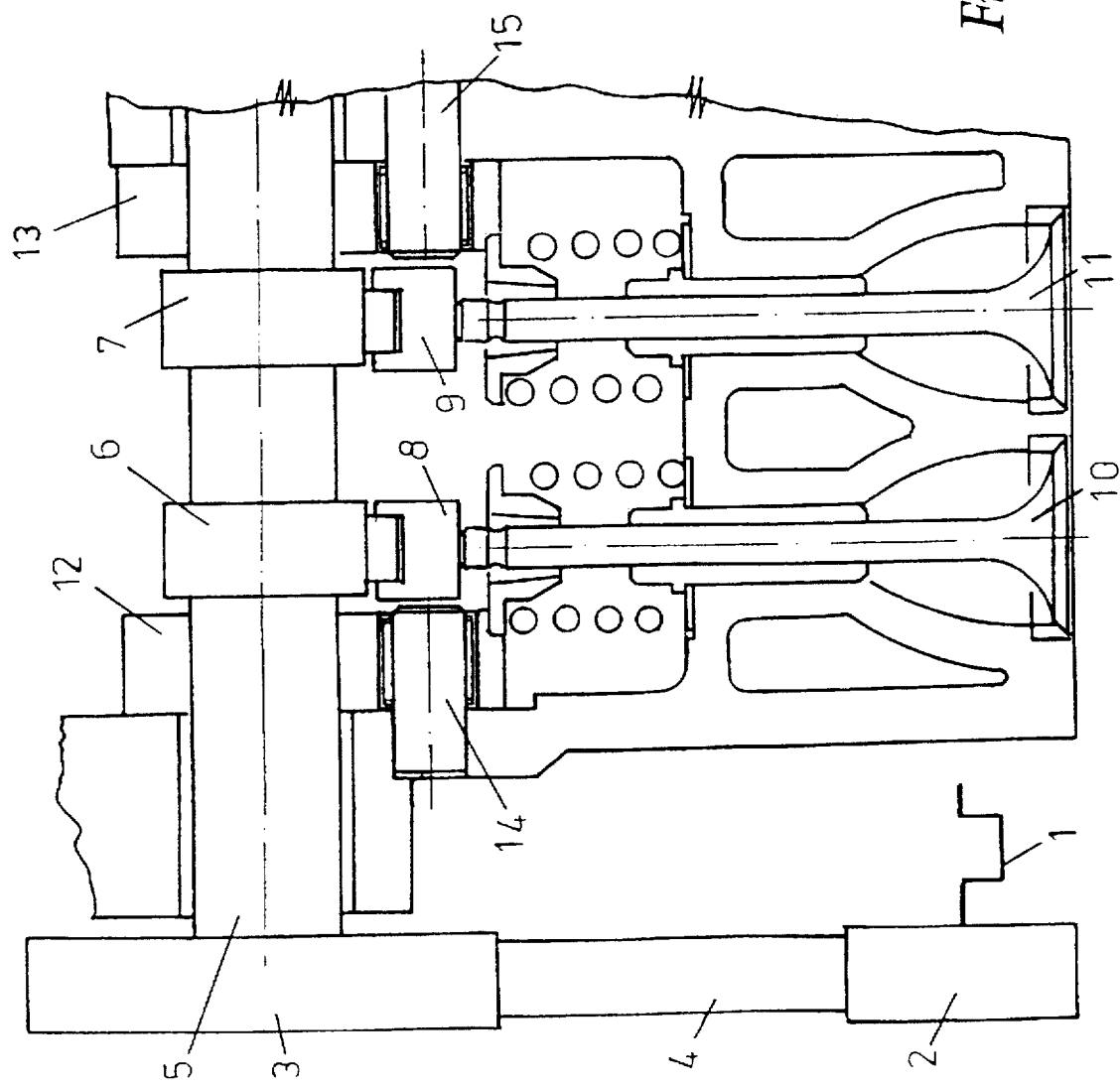
FIG. 1 is a schematic side view of an upper portion of one end of a cylinder head incorporating a camshaft which is movable relative to a pair of inlet valves driven by that camshaft.

Referring to FIGS. 1 and 2, a schematically represented crankshaft 1 drives a pulley or sprocket 2 which drives a further pulley 3 by means of a belt or chain 4. The pulley 3 is attached to a camshaft 5 which supports cams 6 and 7. The cam 6 actuates a pivotal lever 8 and the cam 7 actuates a pivotal lever 9. The lever 8 in turn controls the position of an inlet valve 10 and the lever 9 controls the position of an inlet valve 11.

The camshaft 5 is rotatably mounted on camshaft supports 12 and 13, the support 12 being pivotally mounted on a pin 14 and the support 13 being pivotally mounted on a pin 15. The pins 14 and 15 are axially aligned and fixed in position relative to the engine. The axes of the pins 14 and 15 are parallel to the axis of rotation of the camshaft 5.

FIG. 2 shows the camshaft support 12, the camshaft 5 and the pin 14. The camshaft support 12 is pivotally connected by a pin 16 to a link 17 which defines a circular aperture through which a control shaft 18 extends. An eccentric number 19 is fixed on the control shaft 18, the eccentric rotating with the control shaft 18 and being received within the circular aperture defined by the link 17. Thus rotation of the shaft 18 displaces the link 17 relative to the axis of that shaft and thereby displaces the camshaft support 12 about the axis of the pin 14.

The shaft 18 extends through a further link which couples it to the other camshaft support 13. Thus rotation of the shaft 18 enables the angular position of the supports 12 and 13 relative to the axes of the pins 14 and 15 to be adjusted. Angular movement of the supports 12 and 13 causes an equal angular movement of the axis of the camshaft 5.

The camshaft supports 12 and 13 awe supported on the pins 14 and 15 by needle bearings and hence can move smoothly and with minimal frictional effects relative to the engine block. That movement is controlled by rotation of the shaft 18 in response to any appropriate control input, for example an input proportional to engine speed.

Figure 4:
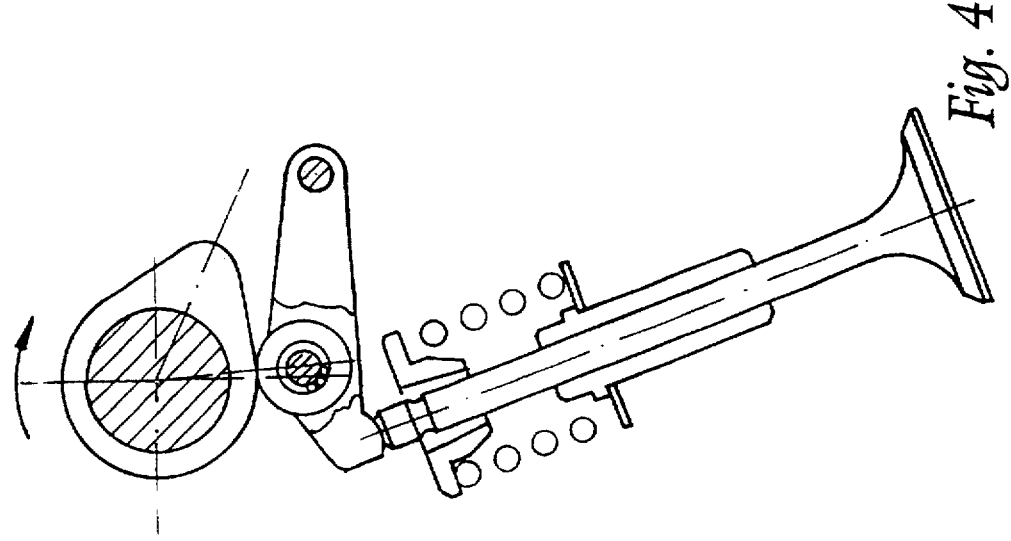
FIG. 4 is a view corresponding to that of FIG. 3 showing the components in their relative orientations at the beginning of the period in which the valve is opened when the camshaft has been moved.
Figure 3:
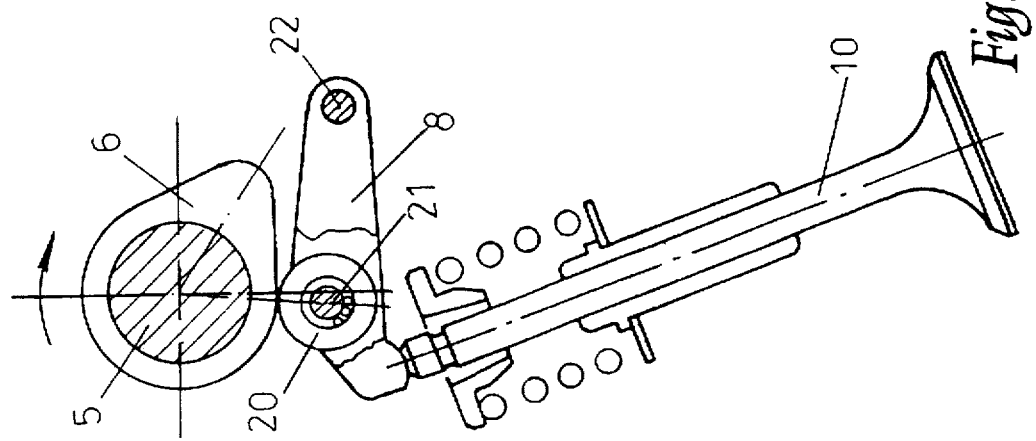
FIG. 3 illustrates the relative orientation of the camshaft, a valve operating lever with a roller follower, and a valve assembly driven by that lever, the components being shown in the position at the start of a period in which the inlet valve is open.

Referring to FIGS. 3 and 4, the interrelationship between the cam 6, lever 8 and valve 10 is shown in greater detail. The cam 6 bears against a roller 20 supported on a pin 21 by needle bearings. The pin 21 is fixed to the lever 8 which is pivotal about a further pin 22 that is fixed to the engine block. The end of the lever 8 remote from the pin 22 is in contact with the end of the valve 10. It can be seen that in FIG. 3 the vertical centre line of the camshaft 5 is offset to the right of the vertical centre line of the roller 20. In contrast, in FIG. 4, it can be seen that the vertical centre line of the camshaft 5 is offset to the left of the vertical centre line of the roller 20. FIG. 3 shows the position of the camshaft 5 at the start of inlet valve opening whereas FIG. 4 shows the position of the camshaft 5 at the start of inlet valve opening after the camshaft has been moved.

Figure 5:
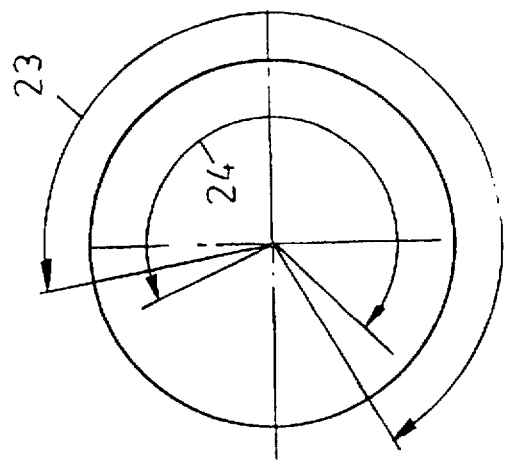
FIG. 5 is a valve timing diagram illustrating a phase shift which is achieved as a result of movement of the camshaft of FIG. 1.

Referring to FIG. 5, this shows the phase shift produced as a result of the displacement of the camshaft 5 from the position shown in FIG. 3 to the position shown in FIG. 4. The line 23 corresponds to the configuration of FIG. 3 whereas the line 24 corresponds to the configuration of FIG. 4. Such a phase shift can be achieved in the structure shown in FIGS. 1–4 by having for example a control actuator responsive to engine speed, or engine speed and load, turning the control shaft 18. The eccentrics mounted on this shaft cause the links to move the camshaft support 12 and 13 and thus to move the camshaft 5. The movement of the camshaft may be for example limited to an arc of length 3 mm, this movement being divided equally about the vertical centre line through the roller followers 20. This introduces an angular difference about the rotational axis of the camshaft 5 when the cams 6 and 7 start to open the associated valves. This angular difference is the phase shift which is illustrated in engine crankshaft degrees in FIG. 5. Any angular difference in the cam position is doubled at the crankshaft.

It can be seen from FIG. 2 that the camshaft supports 12 and 13 pivot about an axis which is lower than the centre of the axes of the rollers 20. The position of the roller axes is optimised to reduce the valve operating reaction forces which will act on the camshaft supports 12 and 13. It should be noted that although the camshaft and roller axes will be displaced as the camshaft is moved from an off centre position such as shown in FIGS. 3 and 4 to an on centre position, the difference is very small and easily accommodated by the constant velocity ramps defined on the cams 6 and 7. Furthermore, given that the cams 6 and 7 are acting against a roller 20 mounted on needle bearings, and the camshaft supports 17 and 13 are also mounted on needle bearings, the frictional losses will be small and the control system will not be compromised by frictional problems.

The small movement of the camshaft 5 and pulley 3 relative to the engine block can be accommodated by the drive belt 4 or, alternatively, the pulley 3 can be mounted on a fixed axis and connected to the camshaft 5 by a suitable coupling, for example an Oldham coupling.

Referring now to the embodiment illustrated in FIGS. 6 to 15 of the accompanying drawings, the same reference numerals are used where appropriate as are used in the case of the embodiment of FIGS. 1 to 5. Components identified will not be described further in detail except where their features differ from those of the embodiment of FIGS. 1 to 5.

In the arrangement shown in FIG. 6, the camshaft 5 is a tubular structure through which an intermediate drive shaft 25 extends. The axis of rotation of the drive shaft 25 is fixed relative to the engine block, the shaft being driven by the sprocket 3 from the belt 4. The camshaft 5 is mounted on pivotal supports 12 and 13 and can therefore be displaced relative to the intermediate shaft 25 by rotation of the control shaft 18. The camshaft 5 is coupled to the intermediate shaft 25 by a linkage 26 such that rotation of the intermediate shaft 25 causes rotation of the camshaft 5. When the axes of the camshaft 5 and intermediate shaft 25 coincide, the two shafts rotate in perfect synchronism. When the axes arc eccentric relative to each other, the camshaft 5 is alternately accelerated and decelerated relative to the intermediate shaft 25 during each rotation of the shaft 25.

The linkage 26 is shows in greater detail in FIG. 8. The intermediate shaft 25 supports an eccentric 27 which is received in a block 28 running in a slot 29 defined in the linkage 26. The linkage 26 is located between the portion of the camshaft supporting cam 6 and the portion of the camshaft supporting cam 7, the three components being secured together by for example rivets so as to run as a unitary assembly.

FIG. 9 shows the camshaft 5 coaxial with tie intermediate shaft 25 and with the cam 6 in the inlet closing position and in contact with the roller 20. It can be seen that the vertical centre line of the camshaft 5 is offset to the right of the vertical centre line of the roller 20. FIG. 10 shows the relative positions of the intermediate shaft 25 and block 28 when the camshaft 5 is coaxial with the shaft 25 as shown in FIG. 9. FIG. 11 is a valve timing diagram showing the valve timing at high engine speeds at which the relative positions of the camshaft 5 and intermediate shaft 25 as shown in FIGS. 9 and 10 is appropriate.

Figure 15:
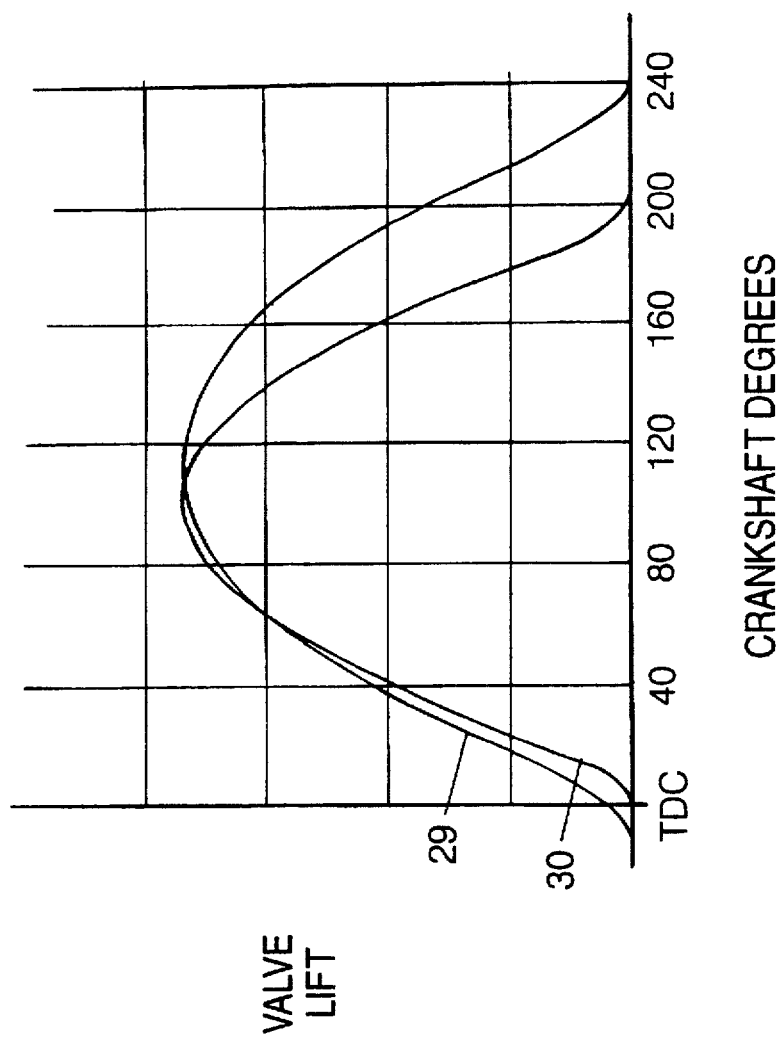
FIG. 15 is a valve timing diagram plotting valve lift against crankshaft degrees for the timing shown in FIGS. 11 and 14.

Referring to FIG. 12, this shows the camshaft 5 in an extreme eccentric position relative to the intermediate shaft 25 and the cam 6 in the inlet valve closing position. It can be seen that the vertical centre line of the camshaft 5 is offset to the left of the vertical centre line of the roller 20. FIG. 13 shows the corresponding position of the intermediate shaft 25 and block 28, and FIG. 14 shows the corresponding valve timing diagram. This is appropriate to a low engine speed. FIG. 15 shown the valve lift plotted against crankshaft degrees for the high and low engine speeds represented in the valve timing diagrams of FIGS. 11 and 14, the line 29 corresponding to FIG. 11 and the lines 30 corresponding to FIG. 14. It wilt be noted that there is a combined phase change and event change.

A combined phase change and event change result because the movement of the camshaft produces a phase change of approximately 13 degrees and also produces an event change duo to the, variable angular velocity of the camshaft of 24 degrees. In the illustrated case the axis of eccentricity is arranged to provide the same angular alteration to the inlet valve opening as to the inlet valve closing. The inlet valve opens at 16 degrees before top dead centre (BTDC) and closes 60 degrees after bottom dead centre (ABDC) at high engine speed. When the camshaft is moved to the eccentric position represented by FIG. 12 the resultant phase change by itself would open the inlet valve 29 degrees BTDC and close the inlet valve at 47 degrees ABDC. Given the event change as a result of the same eccentricity of the camshaft however the result is that the inlet valve opens at 5 degrees BTDC and closes at 23 degrees ABDC. Of course many other valve timings are possible but in this example the rate of inlet valve opening is the same as the rate of inlet valve closing at low engine speed. This minimises frictional losses and achieves good valve trajectories which is advantageous from the point of view of volumetric efficiency. It will be appreciated however that the axis of eccentricity may be arranged to provide different angular alterations to the inlet valve opening and inlet valve closing if this is appropriate in. certain circumstances.

The described system has the advantage of enabling the intermediate drive shaft to be fixed in position. This makes it easy to align the intermediate drive shaft support bearings directly in the engine block. The alignment of the camshaft support bearings is relatively simple given that the camshaft components themselves are relatively short. As the intermediate shaft is fixed into position there is no need to provide a special seal to accommodate shaft displacements when the shaft is driven from a toothed belt. In addition there is no need to use a special belt tensioner.

Figure 17:
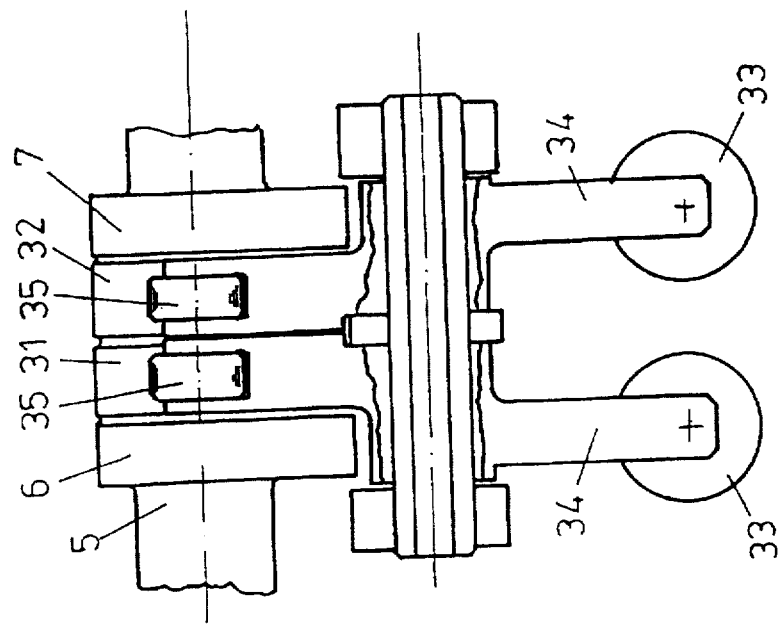
FIGS. 16 and 17 schematically illustrate an embodiment of the present invention in which both inlet and exhaust valves are driven from a common displaceable camshaft.
Figure 16:
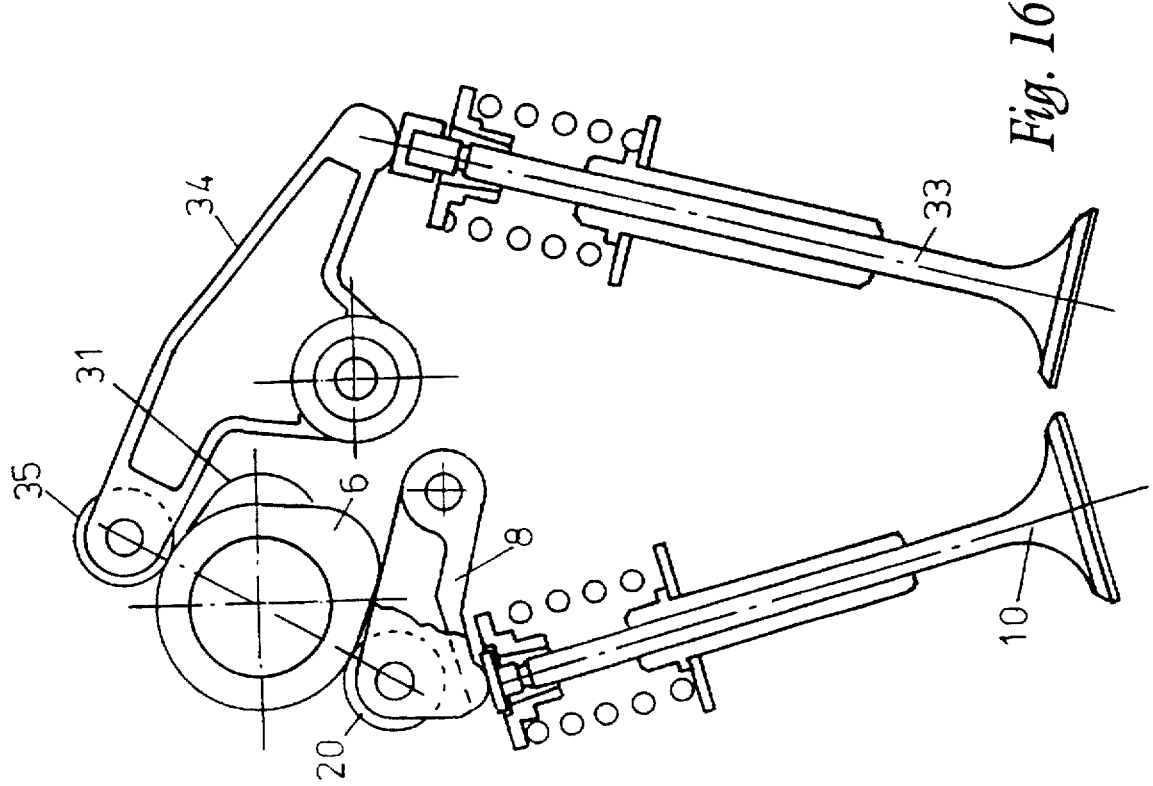

FIGS. 16 and 17 illustrate an embodiment of the present invention in which a reverse phase change is caused to exhaust valves by applying a system such as that shown in FIGS. 1 and 2. As shown in FIGS. 16 and 17, two more cam profiles 31 and 32 are added to the camshaft 5 as it is shown in FIG. 1. The cam profiles 31 and 32 are located between the cam profiles 6 and 7 and exhaust valves 33 are operated by levers 34 in contact with the additional cam profiles 31 and 32, the levers contacting the cain profiles through roller followers 35. The position of the exhaust cam profile on the cam shaft is such that the rollers 35 on the exhaust valve rocker levers 34 are above the camshaft centre line and 180 degrees displaced from the roller followers 20 on the inlet valve levers 8. Movement of the camshaft would then produce a reverse phase change on the exhaust valves as compared to that effected on the inlet valves.

Figure 19:
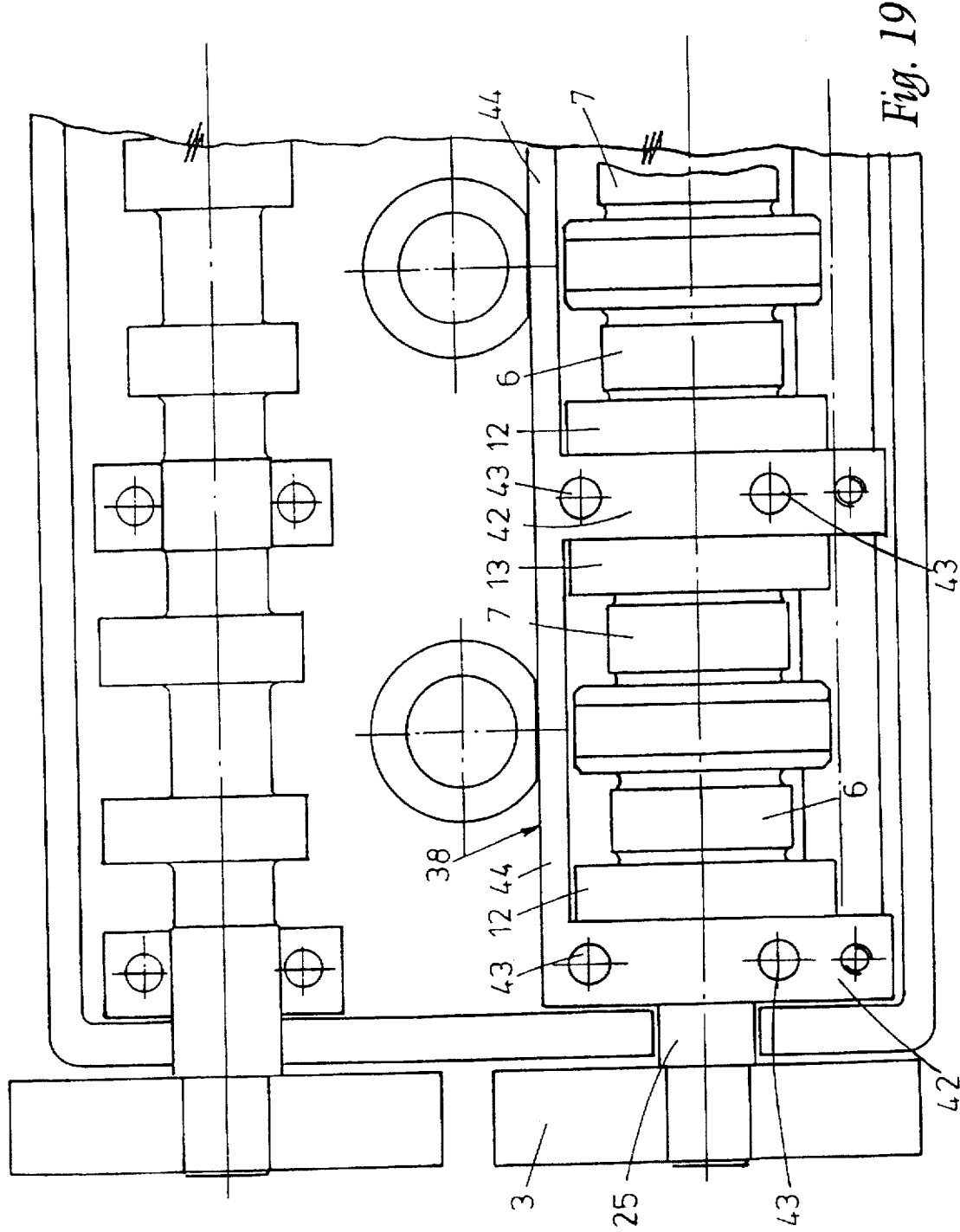
FIG. 19 is a plan view of the engine and subassembly of FIG. 18.

In the embodiments of FIGS. 1 to 17, the components are mounted independently on the engine block. In some circumstances it might be convenient to provide the variable valve timing assembly in a form such that it can be detached from the engine block as a single sub-assembly. FIGS. 18 and 19 schematically illustrate an arrangement which would enable this to be achieved.

Referring to FIGS. 18 and 19, an engine block 36 has secured to it by bolts 37 a subassembly frame 38 defining apertures 39, 40 and 41. The aperture 39 is intended to accommodate the drive shaft 25 of FIG. 6, the aperture 40 is intended to accommodate the camshaft position control shaft 18 of FIG. 7, and the aperture 41 is intended to receive support bearings for one of the pins 14 and 15 of FIG. 6. All of the components of the drive train can thus be incorporated into a subassembly which may be mounted on an engine and then replaced as a single unit.

As shown in FIG. 19, the subassembly frame 38 comprises a series of axially spaced blocks 42 defining bores 43 to receive the bolts 37 (FIG. 18). The blocks 42 are linked by a rib 44 which forms a single casting with the blocks. Cams 6, 7 and camshaft supports 12, 13 are received between each adjacent pair of blocks 42.

In the embodiments of the invention described above with reference to FIGS. 1 to 19, an intermediate member in the form of a lever pivotally mounted on the engine is interposed between a cam and a valve to be controlled by that cam. Alternative intermediate member arrangements are possible however, for example as illustrated in FIG. 20.

Referring to FIG. 20, a valve 45 supports a bucket tappet 46 an upper surface 47 of which is curved. A cam 48 is mounted on a tubular shaft 49 through which an intermediate drive shaft 50 extends. The shaft 49 is displaceable with the cam relative to the shaft 50 in exactly the same way as the shaft 5 and cam 6 are displaceable relative to the shaft 25 in the embodiment illustrated in FIG. 9. The curved surface 47 is not rotationally symmetric and therefore means (not shown) are provided to maintain the illustrated angular orientation of the bucket tappet relative to the cam so that the cam makes contact with the bucket tappet across its full width. As in the case of the embodiments described with reference to FIGS. 1 to 19, the geometry of the displacement path of the cam and of the surface 47 may be selected to achieve a desired relationship between the position of the cam and the phase of the displacement of the valve relative to rotations of the engine camshaft.

It will be appreciated that the present invention can be implemented using conventional valve train components in a conventional cam and lever arrangement. The only modification to the conventional arrangement is that the camshaft is displaceable by the action of an eccentric control rod. This system may thus be implemented at low cost and does not require any rotary seals or other complications. In addition to providing an effective phase change system, in the arrangement of FIGS. 6 to 15 the phase change may be coupled with an event change. This increases the range of variation given to the possible inlet valve closing positions and decreases the range of variation given to the inlet valve opening positions for a given eccentricity. In addition the invention makes it possible to alter the rates of inlet valve closing and opening more advantageously, It will also be appreciated that the camshaft may incorporate cams which control exhaust as well as inlet valves. In such an arrangement a timing adjustment could be made which resulted in a relatively large alteration to tire inlet closing timing and a relatively small alteration to the exhaust opening timing. Such timing alternations would be suitable for a turbocharged engine.

What is claimed is:

1. A valve timing phase changer for an internal combustion engine, said phase changer comprising:

a camshaft driven by a rotating crankshaft of the engine, an intermediate member, a first portion of which bears against a cam supported by the camshaft and a second portion of which bears against a valve of the engine such that rotation of the camshaft displaces the intermediate member and the valve in a cyclical manner, the camshaft being displaceable relative to the intermediate member and valve along a predetermined path, the camshaft being displaceable in a direction perpendicular to the rotational axis of the camshaft, and means for displacing the camshaft in dependence upon a control input, the geometry of the predetermined path and of the first portion of the intermediate member being such that movement of the camshaft alters the phase of valve displacements relative to rotation of the engine crankshaft.

2. A phase changer as in claim 1 wherein the intermediate member includes a pivotally mounted lever.

3. A phase changer as in claim 2 wherein the first portion of the lever comprises a roller supported on the lever by bearings.

4. A phase changer as in claim 2 wherein the first portion of the lever is defined by a curved surface.

5. A phase changer as in claim 2 wherein the camshaft and lever are mounted on a subassembly which can be bolted to the engine.

6. A phase changer as in claim 1 wherein the camshaft supports cams which actuate respective inlet and exhaust valves via respective intermediate members, the camshaft being located between said first portions of said intermediate members.

7. A phase changer as in claim 1 wherein the intermediate member is mounted on the valve, the first portion of the intermediate member being defined by a curved surface.

8. A phase changer as in claim 1 wherein the camshaft is mounted in camshaft supports that are pivotally mounted on the engine and coupled to the displacing means, wherein displacement of the camshaft supports causes the camshaft to be displaced along an arcuate path.

9. A phase changer as in claim 1 wherein the camshaft is driven by an intermediate shaft that is driven in synchronism with the crankshaft and the axis of which is fixed in position relative to the engine, that camshaft being coupled to the intermediate shaft such that displacement of the camshaft alters the duration of displacements of the valve relative to rotation of the engine crankshaft.

10. A phase changer as in claim 9 wherein the camshaft is tubular and the intermediate shaft extends through the camshaft, displacements of the camshaft varying the eccentricity of the camshaft and intermediate shaft axes.

11. A phase changer as in claim 10 wherein the intermediate shaft supports an eccentric received in a block running in a slot defined in the camshaft.

12. A valve timing phase changer for an internal combustion engine, said phase changer comprising:

a camshaft driven by a rotating crankshaft of the engine, an intermediate member, a first portion of which bears against a cam supported by the camshaft and a second portion of which bears against a valve of the engine such that rotation of the camshaft displaces the intermediate member and the valve in a cyclical manner, the camshaft being displaceable relative to the intermediate member and the valve along a predetermined path, and means for displacing the camshaft in dependence upon a control input, the geometry of the predetermined path and of the first portion of the intermediate member being such that movement of the camshaft alters the phase of valve displacements relative to rotation of the engine crankshaft, wherein the camshaft is mounted in camshaft supports that are pivotally mounted on the engine and coupled to the displacing means, wherein displacement of the camshaft supports causes the camshaft to be displaced along an arcuate path, and wherein the displacing means include:
a control shaft rotatable about its major axis,
links pivotally connected to each camshaft support and defining circular apertures through which the control shaft extends, and
eccentrics mounted within the apertures and secured to rotate with the control shaft,
wherein rotation of the control shaft displaces the links relative to the control shaft axis and thereby displaces the camshaft supports.

13. An internal combustion engine incorporating a valve timing phase changer, said engine comprising:
a crankshaft rotatable about a fixed axis,
a camshaft rotatable about an axis which is displaceable in a direction perpendicular to that axis,
a flexible coupling driven by the crankshaft and driving the camshaft, said direction of displacement being such that the spacing between the crankshaft and camshaft axes remains substantially the same and the crankshaft and camshaft remain substantially in phase, and
a rocker arm which bears against an end of an engine valve and defines an arcuate surface against which a cam carried by the camshaft bears, the curvature of said arcuate surface being such that displacement of the camshaft alters the phase of displacements of the valve relative to rotation of the engine crankshaft.

14. An internal combustion engine incorporating a valve timing phase and event changer, said engine comprising:
a crankshaft rotatable about a fixed axis,
an intermediate drive shaft driven by and in synchronism with the crankshaft and rotatable about a fixed axis,
a tubular camshaft rotatable about an axis which is parallel to and is displaceable relative to the axis of the intermediate drive shaft, the camshaft being displaceable along a predetermined path perpendicular to the axis of the intermediate drive shaft, and the intermediate drive shaft extending through the tubular camshaft, a linkage rotatably coupling the intermediate drive shaft to the camshaft, and a rocker arm which bears against an engine valve and defines an arcuate surface against which a cam carried by the camshaft bears, the curvature of the said arcuate surface being such that movement of the camshaft alters the phase and duration of valve timing events.

15. A valve timing phase changer for an internal combustion engine, said phase changer comprising:
a camshaft rotationally driven by an upstream drive train in synchronism and substantially constant relative phase with respect to engine crankshaft rotation;
intermediate valve driving members disposed in a downstream drive train between said camshaft and respectively corresponding engine valves; and
said camshaft being mounted for displacement, relative to said intermediate valve driving members, along a predetermined path that is substantially perpendicular to the camshaft rotational axis, the displacement path and driven surfaces of the intermediate members being shaped to produce phase changes in valve timing as a function of camshaft displacement along said path.

16. A valve timing phase changer as in claim 15 wherein said displacement path is an arcuate path centered on a rotatable camshaft mounting structure that has a rotational axis that is offset from and parallel to the camshaft rotational axis being driven by the engine crankshaft.

17. A method for changing the phase of valve timing for an internal combustion engine, said method comprising:
driving a camshaft rotationally via an upstream drive train in synchronism and substantially constant relative phase with respect to engine crankshaft rotation;
driving engine valves via intermediate valve driving members disposed in a downstream drive train between said camshaft and respectively corresponding engine valves; and
displacing said camshaft relative to said intermediate valve driving members, along a predetermined path that is substantially perpendicular to the camshaft rotational axis, the displacement path and driven surfaces of the intermediate members being shaped to produce phase changes in valve timing as a function of camshaft displacement along said path.

18. A method as in claim 17 wherein said displacement path is an arcuate path centered on a rotatable camshaft mounting structure that has a rotational axis that is offset from and parallel to the camshaft rotational axis being driven by the engine crankshaft.

* * * * *